US009406047B2

(12) United States Patent
Albarrak et al.

(10) Patent No.: US 9,406,047 B2
(45) Date of Patent: Aug. 2, 2016

(54) QUERYING DATABASE CLIENTS UTILIZING EMAIL MESSAGES

(75) Inventors: Khalid Albarrak, Fairfax, VA (US);
Ningning Wang, Mountain View, AK (US); Paul F. Wilms, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 703 days.

(21) Appl. No.: 12/398,092

(22) Filed: Mar. 4, 2009

(65) Prior Publication Data
US 2010/0228765 A1 Sep. 9, 2010

(51) Int. Cl.
*G06F 17/30* (2006.01)
*G06Q 10/10* (2012.01)

(52) U.S. Cl.
CPC ........ *G06Q 10/107* (2013.01); *G06F 17/30424* (2013.01)

(58) Field of Classification Search
CPC .................................................. G06Q 10/107
USPC ......................................... 707/713, 755, 763
See application file for complete search history.

(56) References Cited

U.S. PATENT DOCUMENTS

| 5,826,269 | A * | 10/1998 | Hussey |
|---|---|---|---|
| 6,389,429 | B1 * | 5/2002 | Kane et al. .................... 707/609 |
| 7,035,905 | B2 | 4/2006 | Kikinis |
| 7,080,381 | B2 | 7/2006 | Hannigan et al. |
| 7,280,239 | B2 | 10/2007 | Sekiguchi |
| 2004/0064445 | A1 * | 4/2004 | Pfleging et al. ................... 707/3 |
| 2004/0064733 | A1 | 4/2004 | Gong |
| 2004/0186851 | A1 * | 9/2004 | Jhingan et al. ............. 707/104.1 |
| 2004/0212639 | A1 | 10/2004 | Smoot et al. |
| 2005/0210258 | A1 * | 9/2005 | Birrell et al. ................... 713/178 |
| 2006/0069664 | A1 * | 3/2006 | Ling et al. ......................... 707/1 |
| 2007/0038703 | A1 * | 2/2007 | Tendjoukian et al. ........ 709/206 |
| 2007/0073703 | A1 | 3/2007 | Quin |
| 2007/0118602 | A1 | 5/2007 | Heinla et al. |
| 2007/0203989 | A1 | 8/2007 | Cappannari |
| 2008/0016125 | A1 | 1/2008 | Wilmot |
| 2008/0091646 | A1 * | 4/2008 | Al-Omari et al. .................. 707/2 |
| 2008/0104186 | A1 * | 5/2008 | Wieneke et al. .............. 709/206 |
| 2008/0109520 | A1 | 5/2008 | Tomita |
| 2008/0114833 | A1 | 5/2008 | McLoughlin |
| 2008/0159318 | A1 * | 7/2008 | Pierlot et al. .................. 370/412 |
| 2008/0162923 | A1 * | 7/2008 | Arnold .......................... 713/150 |
| 2008/0222123 | A1 * | 9/2008 | Colby et al. ...................... 707/4 |
| 2008/0270343 | A1 * | 10/2008 | Brodsky et al. ................... 707/2 |
| 2009/0094332 | A1 * | 4/2009 | Schemers et al. ............. 709/206 |

OTHER PUBLICATIONS

Liu, "Email Application for Limited Devices" (Jul. 2003) 60 pp.

* cited by examiner

*Primary Examiner* — James Trujillo
*Assistant Examiner* — Fatima Mina
(74) *Attorney, Agent, or Firm* — Kali Law Group, P.C.

(57) ABSTRACT

Methods for accessing a database utilizing an email service adapter utilizing a computer are presented including: causing the computer to receive an email message from a user at an email server, the email server configured to respond to the email service adapter; processing the email message by the email service adapter, where the email message includes at least a database query; processing the database query with the database; and returning a result email message to the user via the email server, the result email message including at least a database response. In some embodiments, methods further include: when the email message is received by the email server, determining whether the email message is intended for accessing the database; if the email message is not intended for accessing the database, and processing the email message by the email server.

19 Claims, 4 Drawing Sheets

QUERYING DATABASE CLIENTS UTILIZING EMAIL MESSAGES

BACKGROUND

As more and more information is collected and stored, the ability to quickly and easily retrieve useful information becomes more and more critical. In many instances, electronic stores such as databases may be utilized to store information for later access. Typically, accessing relational databases often requires client tools, application interfaces, or command line processing to interact effectively with the database. These tools are well-known in the art and may, in some examples, provide robust accessibility. This is especially true where sophisticated interfaces are utilized. In many instances, complex queries may be generated in response to a specific objective or need. While these types of tools are useful, not all users have the level and degree of sophistication required to utilize these access packages. In addition, not all users have a need to generate complex queries.

In the past, little or no effort was made to provide anything more than a simple command line environment for simple queries. While those environments are indeed simple, they also require a working knowledge of command line syntax. Furthermore, in many examples, command line environments do not provide adequate error processing mechanisms to inform a user of an error and to guide a user to a solution. Thus, while a command line environment may certainly provide direct access to a database, the command line environment is certainly not easily navigated by all users.

As such, systems and method for querying database clients utilizing email messages are provided herein.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Methods for accessing a database utilizing an email service adapter utilizing a computer are presented including: causing the computer to receive an email message from a user at an email server, the email server configured to respond to the email service adapter; processing the email message by the email service adapter, where the email message includes at least a database query; processing the database query with the database; and returning a result email message to the user via the email server, the result email message including at least a database response. In some embodiments, methods further include: when the email message is received by the email server, determining whether the email message is intended for accessing the database; if the email message is not intended for accessing the database, processing the email message by the email server; and if the email message is intended for accessing the database, continuing to the processing the email message by the email service adapter. In some embodiments, the processing the email message by the email service adapter further comprises: parsing the email message, where the parsing the email message provides, the database query, an email server identifier, and a database identifier; mapping the email message to a database user; and conforming the database query in accordance with a database query syntax. In some embodiments, methods further include: if the mapping fails, causing the email service adapter to execute an action from the group consisting of: mapping the email message to a default user, mapping the email message to a default group, and rejecting the email message, where if the email message is rejected, sending a rejection email message to the user.

In other embodiments, computer program products for accessing a database utilizing an email service adapter are presented, the computer program product including: a computer readable medium; first program instructions for receiving an email message from a user at an email server, the email server configured to respond to the email service adapter; second program instructions for processing the email message by the email service adapter, where the email message includes at least a database query; third program instructions for processing the database query with the database; and fourth program instructions for returning a result email message to the user via the email server, the result email message including at least a database response. In some embodiments, method further include: when the email message is received by the email server, fifth program instructions for determining whether the email message is intended for accessing the database; if the email message is not intended for accessing the database, sixth program instructions for processing the email message by the email server; and if the email message is intended for accessing the database, seventh program instructions for continuing to the processing the email message by the email service adapter.

In other embodiments, email based systems for accessing a database are presented including: an email client configured for sending and receiving email messages for a user; an email server configured for routing the email messages; an email service adapter configured for processing any of the email messages containing a database query; a repository for providing mapping information to the email service adapter; and a database for receiving the database query and for returning a database response. In some embodiments, the email service adapter further includes: a parsing component for parsing the email messages containing the database query; a mapping component for mapping the email messages containing the database query to the database; and a query component for conforming the database query in accordance with a database query syntax. In some embodiments, the email service adapter further includes: a session component for opening and closing a session with the database; and a database communication component for sending the database query to the database, and for receiving the database response from the database. In some embodiments, the email service adapter further includes: an error component for triggering an error message, the error message sent by the email server to the user in the event of an error.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks Referring now to the Figures, the flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
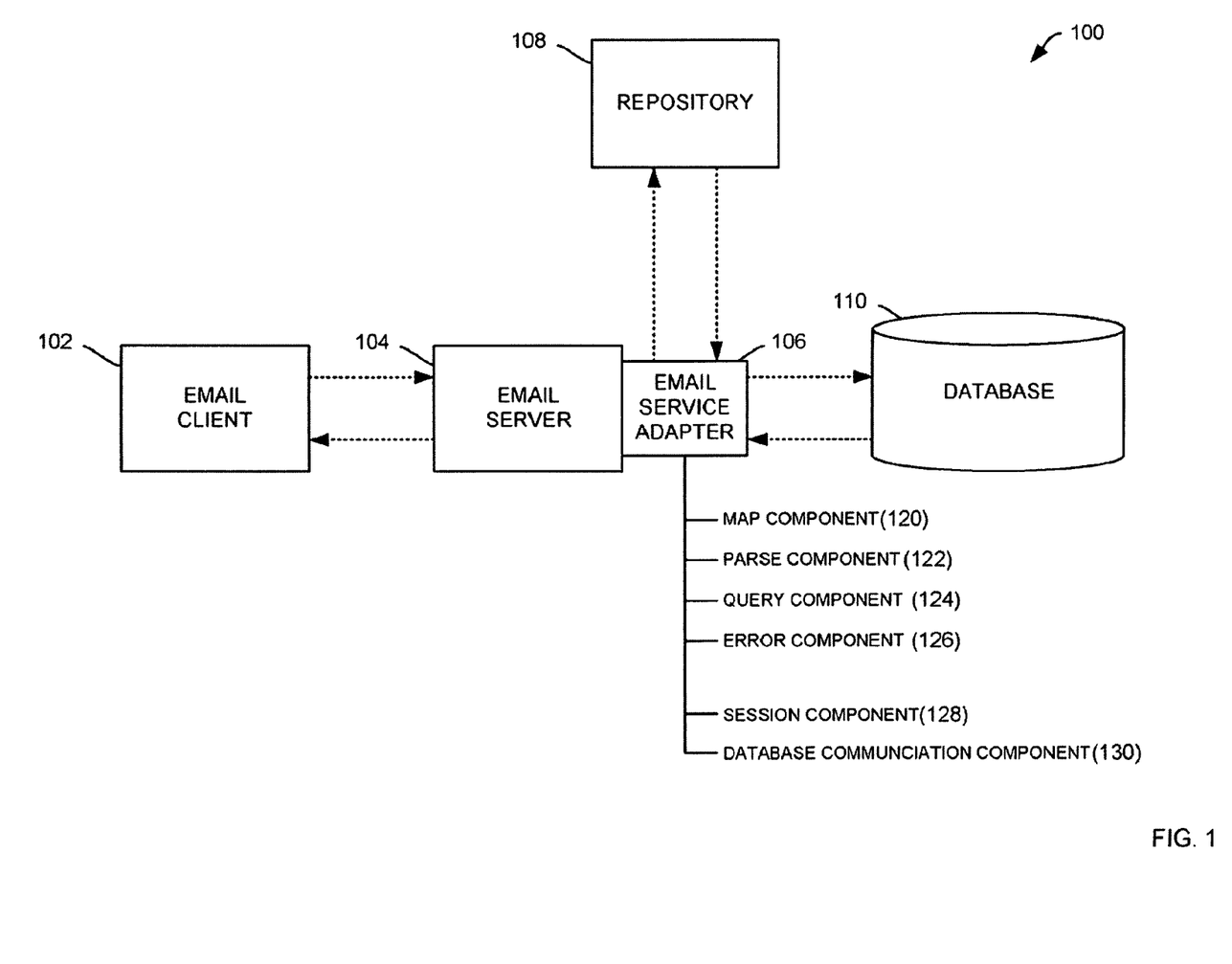
FIG. 1 is an illustrative representation of a system for querying a database utilizing email messages in accordance with embodiments of the present invention.

FIG. 1 is an illustrative representation of a system 100 for querying a database utilizing email messages in accordance with embodiments of the present invention. In embodiments, email client 102 may be utilized for sending and receiving email messages to and from a user. Any email client known in the art may be utilized without limitation in embodiments described herein. In some embodiments, a template for making database queries may be utilized to ensure accuracy or improve convenience. In addition, in some embodiments, example database queries may be enabled in some email clients to ensure accuracy or improve convenience to the user.

Email client 102 may be configured to communicate with email server 104. Email server 104 may be utilized for routing email messages. Any email server known in the art may be utilized without limitation without departing from the present invention. Email server 104 may be configured for communicating with email service adapter 106.

In embodiments, email service adapter 106 may be configured for processing email messages containing a database query. In embodiments, email service adapter 106 functions may include parse component 120 to parse email messages containing a database query. Email service adapter 106 may further include map component 122 to map email messages containing a database query to a database. Email service adapter 106 may further include query component 124 to conform a database query in accordance with database query syntax. In some embodiments, query component 124 may be configured to reject an improperly formatted query. In other embodiments, query component 124 may be configured to correct an improperly formatted query to a best fit with query syntax. Email service adapter 106 may further include error component 126 to trigger an error message in response to an error in processing an email message or processing a query. Error messages, in some embodiments, may include sending an email message to a user having initiated a query. In some embodiments, error messages may be sent to an administrative unit for subsequent correction. Email service adapter functionality will be discussed in further detail below for FIGS. 3-6. As shown, email service adapter 106 may be locally integrated with email server 104. However, the illustration is not intended as limiting as an email service adapter may be local or remote as required or desired.

Email service adapter 106 may be in electronic communication with repository 108. Repository 108 may be configured for storing mapping information relevant to a database query. Repositories, in some embodiments, may include: a Lightweight Directory Access Protocol (LDAP) server, a mapping repository, a metadata repository, a hard coded file, a property file, and a tabulated file. Mapping will discussed in further detail below for FIG. 3. Email service adapter 106 may also be in electronic communication with database 110. In order to interact with database 110, email service adapter 106 may be configured for opening and closing sessions with database 110, sending queries to database 110, and receiving results from database 110. Email service adapter 106 may include session component 128 for opening and closing a database session. In some embodiments, mapping the email message containing a database query returns login and password information for opening a session with a database. Email service adapter 106 may further include database communication component 130 for sending a database query to a database and for receiving a database response from the database. Processing queries will be discussed in further detail below for FIG. 5. In some embodiments, databases may include: a relational database, a flat database, a local database, an Internet database, a DB2™ database, an Oracle™ database, an SQL™ database, a MySQL™ database, a Sybase™ database, and a Teradata™ database.

Figure 2:
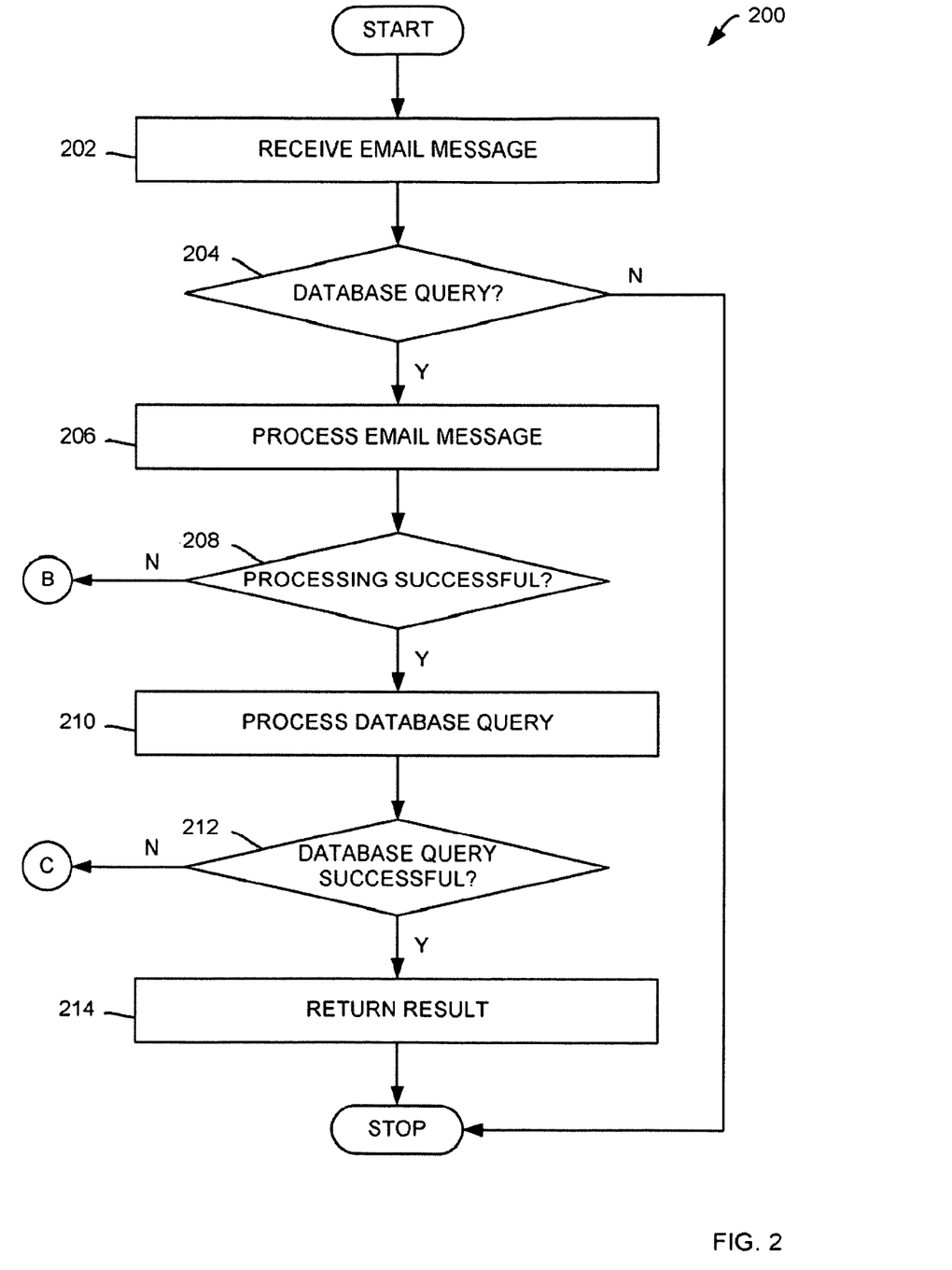
FIG. 2 is an illustrative flowchart for querying a database utilizing email messages in accordance with embodiments of the present invention.

FIG. 2 is an illustrative flowchart 200 for querying a database utilizing email messages in accordance with embodiments of the present invention. At a first step 202, the method receives an email message. In embodiments, an email message may be sent by a user desiring to communicate with a selected database. The email message may be received by an email server configured to respond to an email service adapter in some embodiments. As may be appreciated, any email server known in the art may be utilized without limitation without departing from embodiments described herein. In embodiments, an email message may contain several portions including a database query, an email server identifier, and a database identifier. At a next step 204, the method determines whether the email message includes a database query. If the method determines at a step 204 that the email message does not contain a database query, the method ends so that the email server may properly process the email message for delivery. If the method determines at a step 204 that the email message does contain a database query, the method continues to a step 206 to process the email message. Processing an email message may include several steps, which will be discussed in further detail below for FIG. 3.

At a next step 208, the method determines whether processing was successful. If the method determines at a step 208 that processing was not successful, the method continues to a step 402 (FIG. 4) to process a processing error. FIG. 4 is an illustrative step for processing errors in accordance with embodiments of the present invention. Processing errors may include any number of errors without limitation such as, parsing errors or mapping errors, which will be discussed in further detail below for FIG. 3. Furthermore, in embodiments, an email service adapter may be configured to process email messages. If the method determines at a step 208 that processing was successful, the method continues to a step 210 to process a database query. In embodiments, a database query may include a query command, an administrative command, and an SQL query. Processing a database query may include several steps, which will be discussed in further detail below for FIG. 5.

At a next step 212, the method determines whether a database query was successfully processed. If the method determines at a step 212 that a database query was not successfully processed, the method continues to a step 602 (FIG. 6) to process a database query error. In embodiments, database query processing errors may include any number type of error without limitation. If the method determines at a step 212 that a database query was successfully processed, the method continues to a step 214 to return a result email message to a user via an email server. In embodiments, a result email message may include a database response, an email server identifier, and a database identifier. In some embodiments, a database response may include a notification requiring a user to provide further information such as, for example, a password, an additional query, or a modified query. The method then ends.

Figure 3:
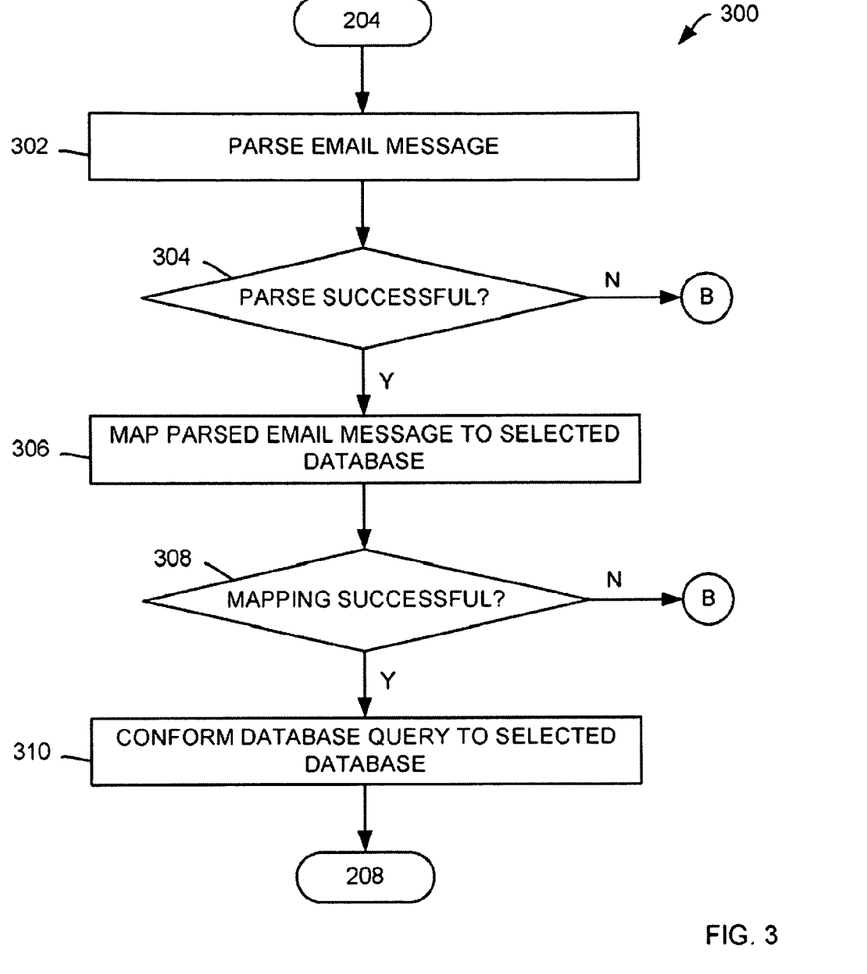
FIG. 3 is an illustrative flowchart for processing an email message in accordance with embodiments of the present invention.
Figure 4:
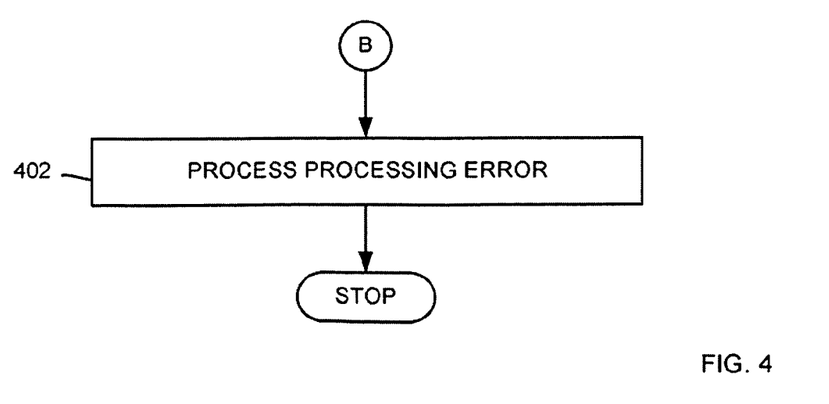
FIG. 4 is an illustrative step for processing errors in accordance with embodiments of the present invention.

FIG. 3 is an illustrative flowchart 300 for processing an email message in accordance with embodiments of the present invention. In particular, FIG. 3 further illustrates a step 206 (FIG. 2). At a first step 302, the method parses an email message. As noted above, an email message processed utilizing embodiments described herein may include a database query, an email server identifier, and a database identifier. Parsing an email message extracts the relevant information provided by elements included in an email message such that a database query may be processed. In some embodiments, email messages may contain information not relevant to a database communication. At a next step 304, the method determines whether parsing an email message was successful. If the method determines that parsing an email message was not successful at a step 304, the method continues to a step 402 (FIG. 4) to process a parsing error. Any number of parsing errors may result without departing from embodiments herein. For example, a parsing error may result when insufficient information to perform a database query is found. In some embodiments, a user may be notified for further user action when a processing error occurs.

If the method determines at a step 304 that parsing an email message was successful, the method continues to a next step 306 to map a parsed email message to a selected database. As noted above, email messages processed utilizing methods described herein may include a database identifier that identifies a specific database. Thus, a database identifier may be utilized to map a database query in accordance with the specified database. Mapping may be accomplished utilizing a repository that contains information related to a specified database. In embodiments, repositories may include an LDAP server, a mapping repository, a metadata repository, a hard coded file, a property file, and a tabulated file. Mapping may be accomplished in any manner known in the art without departing from embodiments described herein.

At a next step 308, the method determines whether mapping was successful. If the method determines that mapping was not successful at a step 308, the method continues to a step 402 (FIG. 4) to process a mapping error. Mapping errors may result in any number of actions including: mapping an email message to a default user, mapping an email message to a default group, or rejecting an email message. In some embodiments, if an email message is rejected, the method sends a rejection email message to the user. If the method determines that mapping was successful at a step 308, the method continues to a step 310 to optionally conform a database query to a selected database. In particular, a database query included in an email message may be conformed to comply with a specified database's query syntax. As may be appreciated, a database query generated by a user may not be syntactically correct as required by a specified database. This may occur for any number of reasons. For example, a user may be utilizing outdated syntax, or a user may not be sufficiently familiar with database syntax to correctly generate a valid query. The method then continues to a step 208 (FIG. 2).

Figure 5:
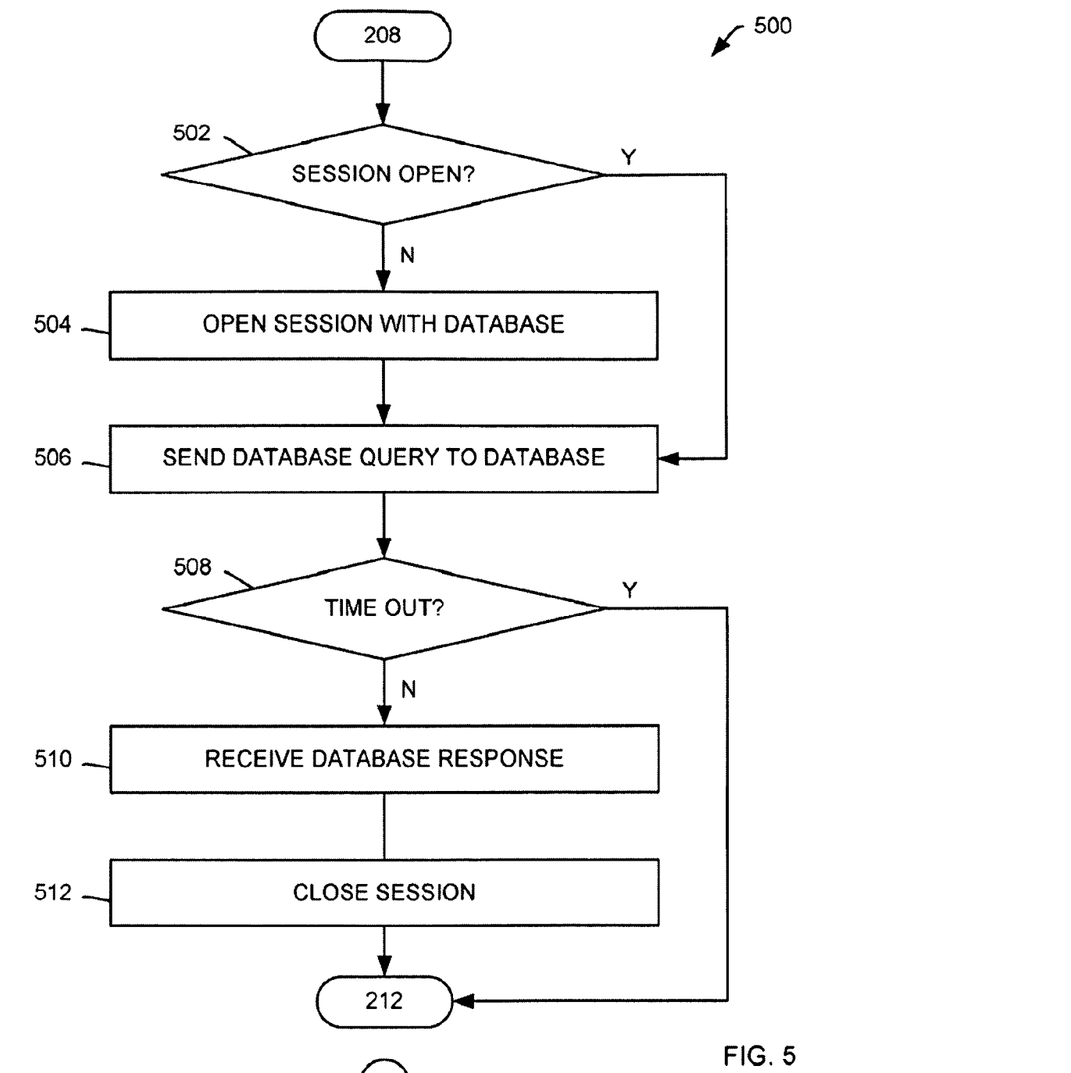
FIG. 5 is an illustrative flowchart for processing a database query in accordance with embodiments of the present invention.
Figure 6:
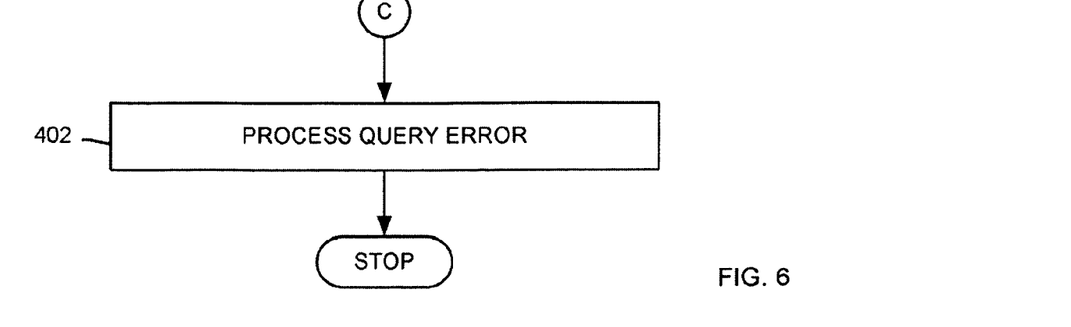
FIG. 6 is an illustrative step for processing a query error in accordance with embodiments of the present invention.

FIG. 5 is an illustrative flowchart 500 for processing a database query in accordance with embodiments of the present invention. In particular, FIG. 5 further illustrates a step 210 (FIG. 2). At a first step 502, the method determines whether a session with a database is all ready open. In some embodiments, a session may be started whereupon additional user input is required. In those embodiments, an email message requesting further input may be generated without ending a current session. As may be appreciated in some embodiments, sessions continued in this manner may be timed out if a response is not received within a prescribed period. If the method determines that a session is not open at a step 502, the method continues to open as session with a specified database at a step 504 whereupon the method continues to a step 506. A session may be opened utilizing any protocol specified as a result of a mapping of an email message as described above without departing from present embodiments. If the method determines that a session is open at a step 502, the method continues to a step 506 to send a database query to the specified database. Sending a database query may be accomplished in any manner known in the art without departing from present embodiments.

At a next step 508, the method optionally determines whether the session should be timed out. Timing out a session may optionally, in some embodiments, result on expiry of a database response timer. That is, the email service adapter, not the database, may issue a timeout if a session is not completed within a prescribed timeframe. In some embodiments, timing out may be utilized to limit resource allocation. In some embodiments, the email service adapter may be configured to reject an email message and send a rejection email message to a user in the event of a timeout. Thus, if the method determines that a session should be timed out at a step 508, the method ends. If the method determines that a session should not be timed out at a step 508, the method continues to a step 510 to receive a database response for the database whereupon the method continues to a step 512 to close the session with the database. The method then ends.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A method for accessing a database utilizing an email service adapter utilizing a computer, the method comprising:
   causing the computer to receive an email message from a user at an email server, wherein the email server is configured to process the email message when the email message does not contain at least a database query, wherein the email service adapter is configured to process the email message only when the email message includes at least the database query, and wherein the email message includes a template for making the database query and for ensuring accuracy of the database query;
   processing the email message by the email service adapter at the email server, wherein
      the email message includes at least the database query, wherein
      the processing the email message includes,
         parsing the email message, wherein
            the parsing the email message provides,
               the database query,
               an email server identifier, and
               a database identifier extracted from relevant information provided by elements included in the email message such that the database query may be processed,
         mapping the email message to the database, and
         conforming the database query in accordance with a database query syntax, wherein conforming includes correcting an improperly formatted database query if the improperly formatted database query is not syntactically correct as required by the database;
   processing the database query with the database; and
   returning a result email message to the user via the email server, the result email message including at least a database response.

2. The method of claim 1, further comprising:
   when the email message is received by the email server, determining whether the email message is intended for accessing the database, wherein the determining is based on whether the email message includes the at least one database query;
   if the email message is not intended for accessing the database, processing the email message by the email server; and if the email message is intended for accessing the database, continuing to the processing the email message by the email service adapter.

3. The method of claim 1, further comprising:
if the mapping fails, causing the email service adapter to execute an action from the group consisting of: mapping the email message to a default user, mapping the email message to a default group, and rejecting the email message, wherein if the email message is rejected, sending a rejection email message to the user.

4. The method of claim 1, wherein the mapping includes utilizing a repository selected from the group consisting of: a Lightweight Directory Access Protocol (LDAP) server, a mapping repository, a metadata repository, a hard coded file, a property file, and a tabulated file.

5. The method of claim 1, wherein the database is selected from the group consisting of: a relational database, a flat database, a local database, an Internet database, a DB2™ database an Oracle™ database, an SQL™ database, a MySQL™ database, a Sybase™ database, and a Teradata™ database.

6. The method of claim 1, wherein the database query is selected from the group consisting of: a query command, an administrative command, and an SQL query.

7. The method of claim 1, wherein the processing the database query comprises:
opening a session with the database;
sending the database query to the database;
receiving the database response from the database; and
closing the session with the database.

8. The method of claim 7, further comprising:
timing out the session on an expiry of a database response timer;
rejecting the email message; and
sending a rejection email to the user.

9. The method of claim 1, wherein the result email message further includes, an email server identifier, a database identifier.

10. A computer program product for accessing a database utilizing an email service adapter, the computer program product comprising:
a non-transitory computer readable medium;
first program instructions for receiving an email message from a user at an email server, wherein the email server is configured to process the email message when the email message does not contain at least a database query, wherein the email service adapter is configured to process the email message only when the email message includes at least the database query, and wherein the email message includes a template for making the database query and for ensuring accuracy of the database query;
second program instructions for processing the email message by the email service adapter, wherein the email message includes at least the database query; wherein the second program instructions for processing the email message includes,
eighth program instructions for parsing the email message, wherein the eighth program instructions for parsing the email message provides,
the database query,
an email server identifier, and
a database identifier extracted from relevant information provided by elements included in the email message such that the database query may be processed;
ninth program instructions for mapping the email message to the database; and
tenth program instructions for conforming the database query in accordance with a database query syntax, wherein conforming includes correcting an improperly formatted database query if the improperly formatted database query is not syntactically correct as required by the database;
third program instructions for processing the database query with the database; and
fourth program instructions for returning a result email message to the user via the email server, the result email message including at least a database response.

11. The computer program product of claim 10, further comprising:
when the email message is received by the email server, fifth program instructions for determining whether the email message is intended for accessing the database, wherein the determining is based on whether the email message includes the at least one database query;
if the email message is not intended for accessing the database, sixth program instructions for processing the email message by the email server; and
if the email message is intended for accessing the database, seventh program instructions for continuing to the processing the email message by the email service adapter.

12. The computer program product of claim 10, wherein the ninth program instructions for mapping includes eleventh program instructions for utilizing a repository selected from the group consisting of: a Lightweight Directory Access Protocol (LDAP) server, a mapping repository, a metadata repository, a hard coded file, a property file, and a tabulated file.

13. The computer program product of claim 10, wherein the third program instructions for processing the database query comprises:
twelfth program instructions for opening a session with the database;
thirteenth program instructions for sending the database query to the database;
fourteenth program instructions for receiving the database response from the database; and
fifteenth program instructions for closing the session with the database.

14. An email based system for accessing a database comprising: an email client having a processor configured for sending and receiving a plurality of email messages for a user, wherein at least some of the plurality of email messages include a database query, wherein the email messages containing the database query include an email server identifier and a database identifier, and wherein the email message includes a template for making the database query and for ensuring accuracy of the database query;
an email server having a processor configured for routing the email message when the email message does not contain the database query;
an email service adapter configured for processing only email messages containing the database query at the email server; wherein the email service adapter includes:
a parsing component for parsing the email messages containing the database query extracted from relevant information provided by elements included in the email message such that the database query may be processed,
a mapping component for mapping the email messages containing the database query to the database, and a query component for conforming the database query in accordance with a database query syntax, wherein conforming includes correcting an improperly formatted database query if the improperly formatted database query is not syntactically correct as required by the database;

a repository having a memory for providing mapping information to the email service adapter; and a database having a memory for receiving the database query and for returning a database response.

15. The system of claim 14, wherein the email service adapter further comprises:

a session component for opening and closing a session with the database; and a database communication component for sending the database query to the database, and for receiving the database response from the database.

16. The system of claim 14, wherein the email service adapter further comprises:

an error component for triggering an error message, the error message sent by the email server to the user in the event of an error.

17. The system of claim 14, wherein the mapping source is selected from the group consisting of: a Lightweight Directory Access Protocol (LDAP) server, a mapping repository, a metadata repository, a hard coded file, a property file, and a tabulated file.

18. The system of claim 14, wherein the database is selected from the group consisting of: a relational database, a flat database, a local database, an Internet database, a DB2™ database, an Oracle™ database, an SQL™ database, a MySQL™ database, a Sybase™ database, and a Teradata™ database.

19. The system of claim 14, wherein the database query is selected from the group consisting of: a query command, an administrative command, and an SQL query.

* * * * *